US009112213B2

(12) United States Patent
Chung et al.

(10) Patent No.: US 9,112,213 B2
(45) Date of Patent: Aug. 18, 2015

(54) ACTIVE MATERIAL FOR A SECONDARY BATTERY, SECONDARY BATTERY INCLUDING THE ACTIVE MATERIAL, AND METHOD OF PREPARING AN ACTIVE MATERIAL

(71) Applicant: SAMSUNG SDI CO., LTD., Yongin-si, Gyeonggi-do (KR)

(72) Inventors: Byung-Joo Chung, Yongin-si (KR); Eon-Mi Lee, Yongin-si (KR); Woo-Cheol Shin, Yongin-si (KR); Tae-Sik Kim, Yongin-si (KR); Jong-Ki Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 73 days.

(21) Appl. No.: 13/772,554

(22) Filed: Feb. 21, 2013

(65) Prior Publication Data
US 2014/0127578 A1    May 8, 2014

Related U.S. Application Data

(60) Provisional application No. 61/722,920, filed on Nov. 6, 2012.

(51) Int. Cl.
H01M 10/0562    (2010.01)
H01M 4/134    (2010.01)
H01M 4/1395    (2010.01)
H01M 4/36    (2006.01)
H01M 10/052    (2010.01)
H01M 4/62    (2006.01)

(52) U.S. Cl.
CPC ............ *H01M 4/134* (2013.01); *H01M 4/1395* (2013.01); *H01M 4/364* (2013.01); *H01M 4/366* (2013.01); *H01M 10/052* (2013.01); *H01M 4/623* (2013.01); *Y02E 60/122* (2013.01); *Y02T 10/7011* (2013.01)

(58) Field of Classification Search
CPC ... H01M 4/134; H01M 4/463; H01M 10/054; H01M 4/386; H01M 4/12; H01M 2004/02
USPC ................. 429/164, 302, 319, 221, 223, 226, 429/231.95
See application file for complete search history.

(56) References Cited

U.S. PATENT DOCUMENTS

| 7,285,358 | B2 | 10/2007 | Park et al. | |
|---|---|---|---|---|
| 2002/0031708 | A1* | 3/2002 | Krause et al. | 429/231.1 |
| 2003/0129494 | A1* | 7/2003 | Kaneda et al. | 429/231.1 |
| 2007/0059600 | A1 | 3/2007 | Kim et al. | |
| 2011/0086271 | A1* | 4/2011 | Lee et al. | 429/220 |
| 2011/0256452 | A1* | 10/2011 | Cho et al. | 429/218.1 |

(Continued)

FOREIGN PATENT DOCUMENTS

KR    10-2003-0032220 A    4/2003
KR    10-2007-0030487 A    3/2007

(Continued)

Primary Examiner — Patrick Ryan
Assistant Examiner — Ben Lewis
(74) Attorney, Agent, or Firm — Lee & Morse, P.C.

(57) ABSTRACT

An active material for a secondary battery, a secondary battery including the active material, and a method of preparing an active material, the active material including a silicon-based core; and an aluminum-based coating layer on at least a part of the silicon-based core.

16 Claims, 4 Drawing Sheets

(56) References Cited

U.S. PATENT DOCUMENTS

2011/0293990 A1  12/2011  Ryu et al.
2012/0202112 A1*  8/2012  Yushin et al. ............... 429/200

FOREIGN PATENT DOCUMENTS

| KR | 10-2011-0130923 A | 12/2011 |
| KR | 10-2012-0054243 A | 5/2012 |

* cited by examiner

ACTIVE MATERIAL FOR A SECONDARY BATTERY, SECONDARY BATTERY INCLUDING THE ACTIVE MATERIAL, AND METHOD OF PREPARING AN ACTIVE MATERIAL

CROSS-REFERENCE TO RELATED APPLICATION

The present application claims priority under 35 U.S.C. §119 to U.S. Provisional Application No. 61/722,920, filed on Nov. 6, 2012, and entitled: "Negative Active Material, Method for Preparation Thereof and Lithium Secondary Battery Comprising the Same," which is incorporated herein by reference in its entirety.

BACKGROUND

1. Field

Embodiments relate to an active material for a secondary battery, a secondary battery including the active material, and a method of preparing an active material.

2. Description of the Related Art

Secondary batteries may be used in portable electronic devices for information communications, e.g., personal data assistants (PDAs), mobile phones, and laptop computers, or electric bicycles, electric vehicles, and the like. In addition, electronic devices are smaller and lighter-weight. Thus, small, light-weight lithium batteries with high charging and discharging capacities may be desirable.

Lithium batteries, e.g., lithium secondary batteries, may be manufactured using materials that facilitate intercalation or deintercalation of lithium ions for a positive electrode and a negative electrode, and an organic electrolyte or polymer electrolyte disposed between the positive electrode and the negative electrode.

Lithium secondary batteries generate electrical energy through oxidation and reduction reactions that take place while intercalation and deintercalation of lithium ions occur in the negative electrode and the positive electrode.

SUMMARY

Embodiments are directed to an active material for a secondary battery, a secondary battery including the active material, and a method of preparing an active material.

The embodiments may be realized by providing an active material for a secondary battery, the active material including a silicon-based core; and an aluminum-based coating layer on at least a part of the silicon-based core.

The aluminum-based coating layer may be porous.

The aluminum-based coating layer may have a layered structure.

The aluminum-based coating layer may include $Al(OH)_3$.

The active material may further include a carbonaceous coating layer on an outer surface of the aluminum-based coating layer.

The active material may further include a binder layer on an outer surface of the aluminum-based coating layer.

The binder layer may include at least one of polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polymethylmethacrylate, polyethylene, polypropylene, styrene-butadiene rubber (SBR), isoprene rubber, polysulfide rubber, chloroprene rubber, silicon rubber, ethylene propylene diene monomer rubber, fluoroelastomer, acethylated SBR, acrylated SBR, epoxy resin, and nylon.

The silicon-based core may include at least one of silicon and a silicon alloy.

The silicon-based core may include the silicon alloy, the silicon alloy including silicon and at least one of a transition metal, tin, and calcium.

The transition metal may include at least one of nickel, titanium, and iron.

The silicon alloy may include about 0.1 to about 40 parts by weight of the at least one of a transition metal, tin, and calcium, based on 100 parts by weight of the active material.

The silicon-based core may include a composite material of silicon or silicon oxide with graphite.

The embodiments may also be realized by providing a secondary battery including a first electrode; a second electrode; and a separator between the first electrode and the second electrode, wherein one of the first electrode and the second electrode includes the active material according to an embodiment.

The aluminum-based coating layer of the active material may include $Al(OH)_3$.

The silicon-based core of the active material may include at least one of silicon and a silicon alloy.

The embodiments may also be realized by providing a method of preparing an active material for a secondary battery, the method including preparing an aluminum-based precursor solution; immersing a silicon-based material in the aluminum-based precursor solution to provide an immersed silicon-based material; and thermally treating the immersed silicon-based material such that the active material includes a silicon-based core and an aluminum-based coating layer on at least a part of the silicon-based core.

The aluminum-based precursor solution may include at least one of aluminum alkoxide, aluminum oxide, aluminum acetylacetonate, and aluminum nitride.

Thermally treating the immersed silicon-based material in the aluminum-based precursor solution may include exposing the solution to a temperature of about 80° C. to about 200° C. for about 1 hour to about 48 hours.

The method may further include mixing the active material with a binder such that the active material includes a binder layer on an outer surface of the aluminum-based coating layer.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
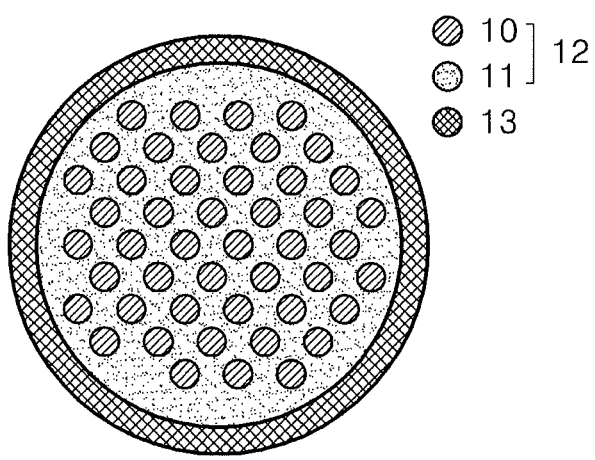
FIG. 1 illustrates a schematic view of a structure of a negative active material according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Hereinafter, embodiments of an active material, e.g., a negative active material, and a method of preparing the same, and a lithium battery that include the active material will be described in detail.

An embodiment provides an active material, e.g., a negative active material, including a silicon-based core or base material and an aluminum-based coating layer on at least part of the silicon-based core.

Silicon (with a charge capacity of about 4,200 mAh/g) may have a high specific capacity per unit gram, but may undergo a serious volumetric expansion, e.g., of about 300% to about 400%, during charging and discharging. Thus, effectively controlling the volumetric expansion of silicon may be desirable.

According to embodiments, including the aluminum-based coating layer having a rigid structure on at least part of the silicon-based core, the active material may effectively control volumetric expansion of the silicon-based core. In an implementation, the active material including the aluminum-based coating layer with a rigid structure on at least part of the silicon-based core may effectively control volumetric expansion of the silicon-based core. For example, the aluminum-based coating layer may help lower a volumetric expansion ratio of the active material (including the silicon-based core) during charging and discharging to about 40% or less, e.g., volumetric expansion of the active material (including the silicon-based core) may be about 40% or less. Therefore, a lithium secondary battery with improved capacity and lifetime characteristics may be manufactured using the active material.

The aluminum-based coating layer may be porous. In an implementation, the aluminum-based coating layer may have a porosity of about 0.01% to about 50%, e.g., about 0.5% to about 20%. When the volume of the silicon-based core (underlying the aluminum-based coating layer) expands during charging and discharging of the lithium secondary battery, the porous aluminum-based coating layer may serve as a buffer layer to effectively control the volumetric expansion of the silicon-based core.

The aluminum-based coating layer may have a layered structure. Such a layered structure may facilitate migration of lithium ions, so that the active material including the aluminum-based coating layer may have improved initial efficiency and lifetime characteristics.

The aluminum-based coating layer may include $Al(OH)_3$. For example, the $Al(OH)_3$ may have a layered structure. $Al(OH)_3$ may have a layered gibbsite structure that is water-insoluble and stable at room temperature. Accordingly, the aluminum-based coating layer including $Al(OH)_3$ may facilitate passing of lithium ions through the structure, and thus the active material including the aluminum-based coating layer including $Al(OH)_3$ may have improved initial efficiency and lifetime characteristics. OH groups on a surface of $Al(OH)_3$ in the aluminum-based coating layer may interact with an electrolyte during charging of the lithium secondary battery, forming a stable solid electrolyte interface (SEI) layer.

The aluminum-based coating layer may have a thickness of, e.g., about 0.001 nm to about 500 nm. In an implementation, the aluminum-based coating layer hay have a thickness of, e.g., about 0.01 nm to about 200 nm or about 0.1 nm to about 100 nm. When the thickness of the aluminum-based coating layer is within these ranges, volumetric expansion of the silicon-based core during charging of the lithium secondary battery may be efficiently controlled, so that the initial efficiency may be improved.

The active material may further include a carbonaceous coating layer on an outer surface of the aluminum-based coating layer.

A carbonaceous material for the carbonaceous coating layer may include a crystalline or amorphous carbonaceous material. For example, the carbonaceous material may include at least one selected from the group of coke, pyrocarbons, natural graphite, artificial graphite, carbon microbeads, graphitized mesocarbon microbeads (MCMB), vapor grown carbon, carbon fibers, pitches, or a mixture thereof.

The carbonaceous coating layer may have a thickness of about 0.001 nm to about 500 nm, e.g., about 0.01 nm to about 200 nm or about 0.1 nm to about 100 nm. When the carbonaceous coating layer is within these ranges, the active material including the carbonaceous coating layer may have improved capacity, and volumetric expansion of the silicon-based core may be efficiently controlled.

The aluminum-based coating layer may further include a binder layer on an outer surface thereof. The binder layer may have elasticity, which may, e.g., compensate for a broken part of the aluminum-based coating layer to be stable on the silicon-based core.

Examples of a binder in the binder layer may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polymethylmethacrylate, polyethylene, polypropylene, styrene-butadiene rubber (SBR), isoprene rubber, polysulfide rubber, chloroprene rubber, silicon rubber, ethylene propylene diene methylene (EPDM), fluoroelastomer, acethylated SBR, acrylated SBR, epoxy resin, and nylon. In an implementation, the binder layer may include a water-based binder.

The binder in the binder layer may include a binder represented by one of Formulae 1 to 3, below.

[Formula 1]

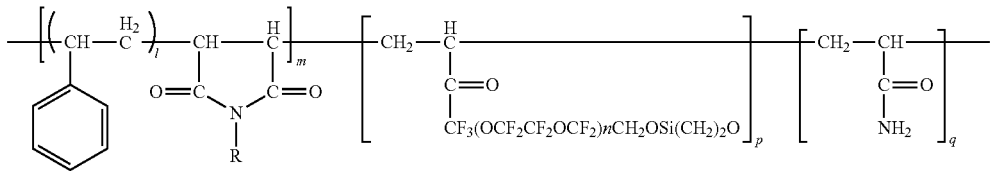

In Formula 1, R may be a substituted or unsubstituted C1-C20 alkyl group, a substituted or unsubstituted C2-C20 alkenyl group, a substituted or unsubstituted C2-C20 alkynyl group, a substituted or unsubstituted C3-C20 cycloalkyl group, a substituted or unsubstituted C6-C20 aryl group, or a substituted or unsubstituted C6-C20 heteroaryl group, l may be an integer from 1 to about 50, m may be an integer from 1 to about 50, n may be an integer from 0 to about 50, p may be an integer from 0 to about 100, and q may be an integer from 1 to about 100, where l+m=100.

The binder represented by Formula 1 may have a weight average molecular weight of about 10,000 to about 2,000,000.

a hydrazone, a carboxyl group or a salt thereof, a sulfonic acid group or a salt thereof, a phosphoric acid group or a salt thereof, or substitution with a C1-C20 alkyl group, a C2-20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

The binder layer may have a thickness of about 0.001 nm to about 500 nm. In an implementation, the binder layer may have a thickness of about 0.01 nm to about 200 nm, e.g., about 0.1 nm to about 100 nm. When the thickness of the binder layer is within these ranges, the active material including the binder layer may efficiently control volumetric expansion of silicon.

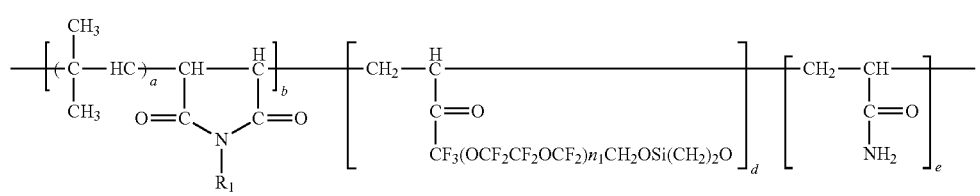

[Formula 2]

In Formula 2, $R_1$ may be a substituted or unsubstituted C1-C20 alkyl group, a substituted or unsubstituted C2-C20 alkenyl group, a substituted or unsubstituted C2-C20 alkynyl group, a substituted or unsubstituted C3-C20 cycloalkyl group, a substituted or unsubstituted C6-C20 aryl group, or a substituted or unsubstituted C6-C20 heteroaryl group, a may be an integer from 1 to about 50, b may be an integer from 1 to about 50, $n_1$ may be an integer from 0 to about 50, d may be an integer from 0 to about 100, and e may be an integer from 1 to about 100, where a+b=100.

The binder represented by Formula 2 may have a weight average molecular weight of about 10,000 to about 2,000,000.

The silicon-based core may include, e.g., silicon or a silicon alloy. The silicon may include or have, e.g., a silicon nanostructure. The silicon nanostructure may include at least one of, e.g., silicon nanoparticles, silicon nanowires, silicon nanorods, silicon nanofilms, silicon nanotubes, and silicon nanoribbons. For example, the silicon nanostructure may be in the form of silicon nanowires.

The silicon-based core may be a composite material of silicon or silicon oxide with graphite, e.g., SiC, $SiO_x$ (0<x≤2), or a composite material of $SiO_x$(0<x≤2) with C. The graphite of the silicon-based base material may be on a surface of or in the silicon or silicon oxide.

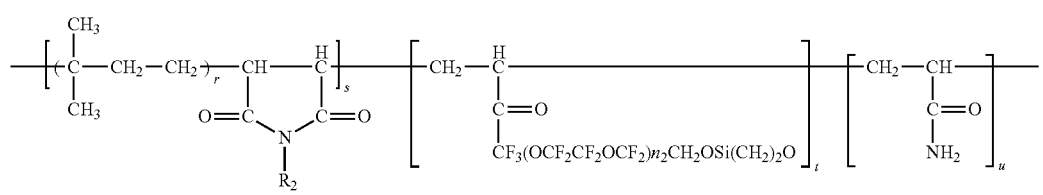

[Formula 3]

In Formula 3, $R_2$ may be a substituted or unsubstituted C1-C20 alkyl group, a substituted or unsubstituted C2-C20 alkenyl group, a substituted or unsubstituted C2-C20 alkynyl group, a substituted or unsubstituted C3-C20 cycloalkyl group, a substituted or unsubstituted C6-C20 aryl group, or a substituted or unsubstituted C6-C20 heteroaryl group, r may be an integer from 1 to about 50, s may be an integer from 1 to about 50, $n_2$ may be an integer from 0 to about 50, t may be an integer from 0 to about 100, and u may be an integer from 1 to about 100, where r+s=100.

The binder represented by Formula 3 may have a weight average molecular weight of about 10,000 to about 2,000,000.

In Formulae 1 to 3 above, the term "substituted" may refer to a substitution with a halogen atom, a C1-C20 alkyl group substituted with a halogen atom (for example, $CF_3$, $CHF_2$, $CH_2F$, $CCl_3$, and the like), a hydroxyl group, a nitro group, a cyano group, an amino group, an amidino group, a hydrazine, In an implementation, the silicon nanowires may have an average diameter of about 20 nm to about 100 nm, e.g., about 30 nm to about 50 nm. In an implementation, the silicon nanowires may have a length of about 1 μm to about 100 μm, e.g., about 5 μm to about 50 μm or about 10 μm to about 30 μm. When the average diameter and length of the silicon nanowires are within these ranges, the silicon nanowires may have a specific surface area in an appropriate range, so that the active material may have improved energy density and lifetime characteristics.

Although being similar to the silicon nanowires, the silicon nanorods may have a smaller aspect ratio than the silicon nanowires. The silicon nanofilms may have a diameter or a thickness of about 500 nm or less. The silicon nanotubes may have a diameter of, e.g., about 500 nm. The silicon nanoribbons may have a width of about 100 nm and an aspect ratio of about 10 or greater.

The silicon alloy may include Si as a main component, and at least one metal selected from the group of a transition metal, tin (Sn), and calcium (Ca). In an implementation, the metal may include at least one of Ni, Ti, Fe, Sn, and Ca. In an implementation, an amount of the metal in the alloy may be about 0.1 parts to about 40 parts by weight, e.g., about 1 part to about 35 parts by weight, based on 100 parts by weight of the active material. When the amount of the metal is within these ranges, the active material with a silicon alloy core containing the metal may have improved capacity characteristics.

Another embodiment provides a method of preparing the active material, e.g., the negative active material. The method may include, e.g., preparing an aluminum-based precursor solution; immersing a silicon-based material in the aluminum-based precursor solution to provide an immersed silicon-based material; and thermally treating the immersed silicon-based material to obtain the active material with an aluminum-based coating layer on at least part of a silicon-based core.

The aluminum-based precursor solution may be prepared by dissolving an aluminum-based precursor in a solvent. The aluminum-based precursor may include at least one selected from the group of aluminum alkoxide, aluminum oxide, aluminum acetylacetonate, and aluminum nitride. In an implementation, the aluminum-based precursor may include aluminum alkoxide, e.g., aluminum isopropoxide (Al(OCH$(CH_3)_2)_3$) or aluminum-tri-sec-butoxide (Al(OCH(CH$_3$)C$_2$H$_5$)$_3$). The solvent may be, e.g., water, alcohol, or benzene.

In the preparing of the aluminum-based precursor solution, an amount of the aluminum-based precursor may be about 0.01 parts to about 99.99 parts by weight, based on 100 parts by weight of the active material. In an implementation, the amount of the aluminum-based precursor may be, e.g., about 0.01 parts to about 50 parts by weight or about 0.01 parts to about 10 parts by weight, based on 100 parts by weight of the active material. When the amount of the aluminum-based precursor is within these ranges, the aluminum-based coating layer formed therefrom may efficiently control volumetric expansion of the silicon-based core.

The silicon-based material (for forming the silicon-based core) may be immersed in the aluminum-based precursor solution and stirred at room temperature for about 12 hours to about 48 hours. The silicon-based material may include silicon or a silicon alloy.

The silicon may be, e.g., a silicon nanostructure. The silicon nanostructure may be in the form of, e.g., silicon nanowires. In an implementation, the silicon nanowires may have an average diameter of about 20 nm to about 100 nm, e.g., about 30 nm to about 50 nm. In an implementation, the silicon nanowires may have a length of about 1 μm to about 100 μm, e.g., about 5 μm to about 50 μm or about 10 μm to about 30 μm. When the average diameter and length of the silicon nanowires are within these ranges, the silicon nanowires may have a specific surface area in an appropriate range, so that the active material may have improved energy density and lifetime characteristics.

The silicon alloy may include Si as a main component, and at least one metal selected from the group of a transition metal, Sn, and Ca. In an implementation, the metal may include at least one of Ni, Ti, Fe, Sn, and Ca. In an implementation, an amount of the metal in the alloy may be about 0.1 parts to about 40 parts by weight, e.g., about 1 part to about 35 parts by weight, based on 100 parts by weight of the active material. When the amount of the metal in the alloy is within these ranges, the active material with a silicon alloy core containing the metal may have improved capacity characteristics.

The silicon-based material (for forming the silicon-based core) immersed in the aluminum-based precursor solution may be thermally treated to obtain an active material with an aluminum-based coating layer on at least part of the silicon-based core. Forming the active material may include treating, e.g., thermally treating, the silicon-based material immersed in the aluminum-based precursor solution at a temperature of about 20° C. to about 200° C., e.g., about 80° C. to about 200° C., for about 1 hour to about 48 hours. In an implementation, the silicon-based material immersed in the aluminum-based precursor solution may be thermally treated at about 100° C. to obtain the active material with the aluminum-based coating layer on at least part of the silicon-based core. In an implementation, an active material further including a carbonaceous coating layer on an outer surface of the aluminum-based coating layer may be prepared.

When the volume of the silicon-based core (underlying the aluminum-based coating layer) expands or shrinks during charging and discharging of the lithium secondary battery, the porous aluminum-based coating layer may serve as a buffer layer to effectively control the volumetric expansion of the silicon-based core.

The aluminum-based coating layer may have a layered structure. Such a layered structure may facilitate migration of lithium ions through the aluminum-based coating layer having the layered structure, so that the active material including the aluminum-based coating layer may exhibit improved initial efficiency and lifetime characteristics.

The aluminum-based coating layer may include Al(OH)$_3$. The aluminum-based coating layer including Al(OH)$_3$ may facilitate passing of lithium ions through the coating layer, and thus the active material including the aluminum-based coating layer may exhibit improved initial efficiency and lifetime characteristics. OH groups on a surface of Al(OH)$_3$ in the aluminum-based coating layer may interact with an electrolyte during charging of the lithium secondary battery, forming a stable solid electrolyte interface (SEI) layer.

In an implementation, the aluminum-based coating layer may have a thickness of about 0.001 nm to about 500 nm, e.g., about 0.01 nm to about 100 nm. When the thickness of the aluminum-based coating layer is within these ranges, volumetric expansion of the silicon-based core during charging of the lithium secondary battery may be efficiently controlled, so that the initial efficiency may be improved.

The active material may further include a carbonaceous coating layer on an outer surface of the aluminum-based coating layer. A carbonaceous material for the carbonaceous coating layer may include, e.g., a crystalline or amorphous carbonaceous material. For example, the carbonaceous material may include at least one selected from the group of coke, pyrocarbons, natural graphite, artificial graphite, carbon microbeads, graphitized mesocarbon microbeads (MCMB), vapor grown carbon, carbon fibers, pitches, or a mixture thereof.

The carbonaceous coating layer may be formed using a suitable method, e.g., by thermally treating at about 600° C. for carbonization.

Another embodiment provides a lithium secondary battery including a first electrode, e.g., a positive electrode, containing a first active material, e.g., a positive active material; a second electrode, e.g., a negative electrode, including a second active material, e.g., a negative active material, and an electrolyte disposed between the first electrode and the second electrode. The active material of one of the first electrode and the second electrode may include the active material according to an embodiment.

Figure 4:
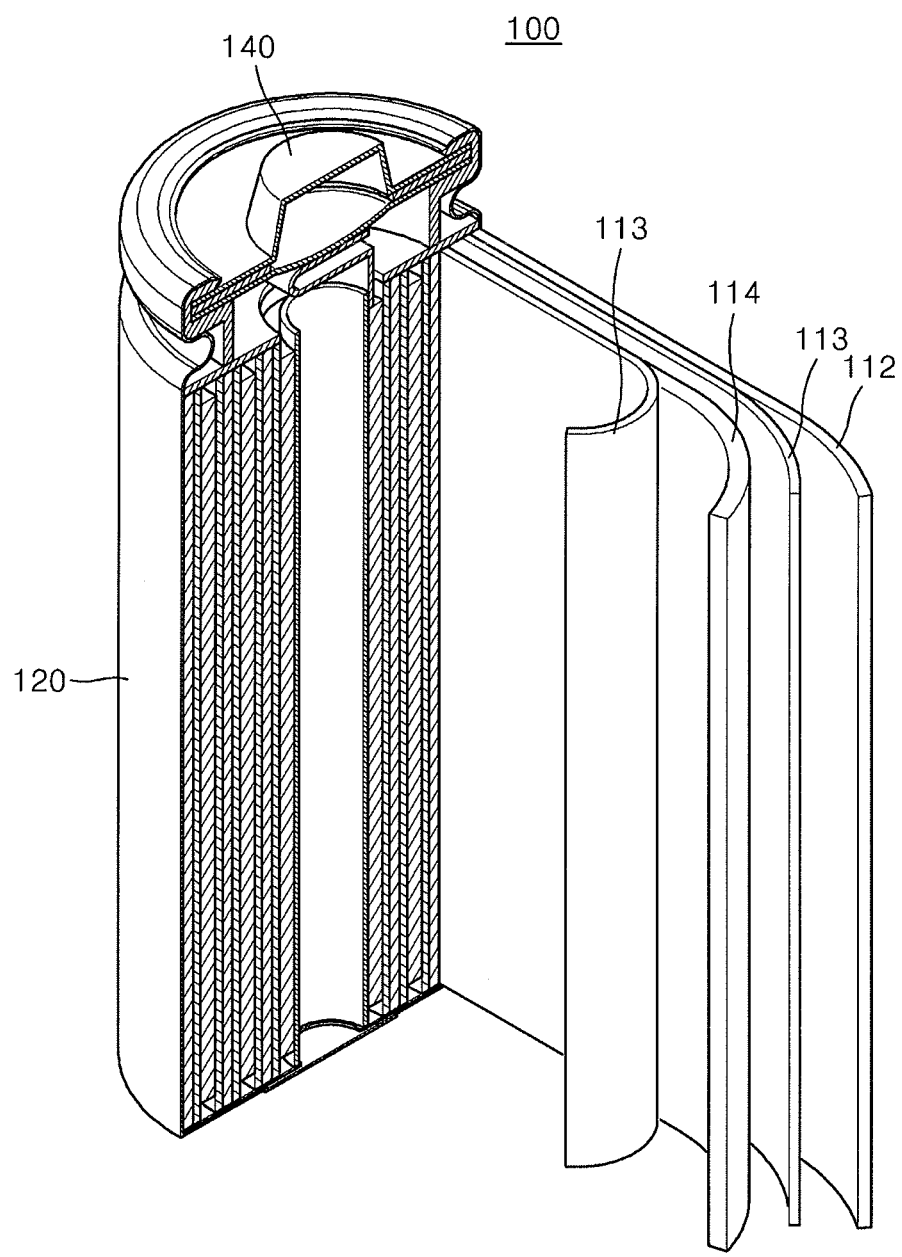
FIG. 4 illustrates an exploded perspective view of a structure of a lithium secondary battery according to an embodiment.

FIG. 4 illustrates an exploded perspective view of a structure of a lithium secondary battery 100 according to an embodiment.

Although the lithium secondary battery 100 illustrated in FIG. 4 is cylindrical, the embodiments are not limited thereto, and lithium secondary batteries according to embodiments may be of, e.g., a rectangular type or a pouch type.

Lithium secondary batteries may include, e.g., lithium ion batteries, lithium ion polymer batteries, or lithium polymer batteries, according to a type of separator and/or electrolyte included therein. In addition, lithium batteries may include, e.g., cylindrical type, rectangular type, coin type, or pouch type, according to a shape thereof. Lithium secondary batteries may include, e.g., either bulk type or thin film type, according to a size thereof. Lithium secondary batteries according an embodiment may have a suitable or appropriate shape.

Referring to FIG. 4, the lithium secondary battery 100 in cylindrical form may include a first, e.g., negative, electrode 112, a second, e.g., positive, electrode 114, a separator 113 disposed between the first electrode 112 and the second electrode 114, and an electrolyte (not shown) (impregnated into the first electrode 112, the second electrode 114, and the separator 113), a battery case 120, and a sealing member 140 sealing the battery case 120. The lithium secondary battery 100 may be manufactured by sequentially stacking the first electrode 112, the separator 113, and the second electrode 114 upon one another to form a stack, rolling the stack in a spiral form, and accommodating the rolled up stack in the battery case 120.

The first, e.g., negative, electrode 112 may include a current collector and an active material layer, e.g., a negative active material layer, on the current collector.

The current collector may be formed of, e.g., stainless steel, nickel, aluminum, iron, titanium, or the like, and may be in the form of e.g., a thin film, plate, mash (grid), foam (sponge), or the like.

The active material, e.g., the negative active material, may include a silicon-based core, and an aluminum-based coating layer on at least part of the silicon-based core. By including such an active material, a lithium secondary battery may have improved capacity and lifetime characteristics.

The aluminum-based coating layer and the silicon-based core may be as described above. FIG. 1 illustrates a schematic view of a structure of an active material according to an embodiment. Referring to FIG. 1, the silicon-based core 12 may include, e.g., Si 10 and/or a Si alloy 11 core. An Al(OH)$_3$ coating layer as an aluminum-based coating layer 13 may be disposed on the silicon-based core.

In an implementation, the active material may further include a carbonaceous coating layer on an outer surface of the aluminum-based coating layer.

In an implementation, the active material may further include a binder layer on an outer surface of the aluminum-based coating layer. For example, a binder in the binder layer may include at least one selected from the group of polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polymethylmethacrylate, polyethylene, polypropylene, styrene-butadiene rubber (SBR), isoprene rubber, polysulfide rubber, chloroprene rubber, silicon rubber, ethylene propylene diene methylene (EPDM), fluoroelastomer, acrylated SBR, epoxy resin, and nylon. In an implementation, the binder layer may include a water-based binder.

In an implementation, the carbonaceous coating layer may have a thickness of about 0.001 nm to about 500 nm, e.g., about 0.01 nm to about 200 nm or about 0.1 nm to about 100 nm. When the thickness of the carbonaceous coating layer is within these ranges, the active material including the layer may exhibit improved capacity, and volumetric expansion of the silicon-based core may be efficiently controlled.

As noted above, the aluminum-based coating layer may further include a binder layer on an outer surface thereof. The binder layer may have elasticity, which may compensate for, e.g., a broken part of the aluminum-based coating layer to be stable on the silicon-based core.

The binder layer may have a thickness of, e.g., about 0.001 nm to about 500 nm. In an implementation, the binder layer may have a thickness of about 0.01 nm to about 200 nm, e.g., about 0.1 nm to about 100 nm. When the thickness of the binder layer is within these ranges, the active material including the binder layer may efficiently control volumetric expansion of the silicon-based core.

The active material layer may further include a conducting agent. The conducting agent may provide conductivity to the electrode including the active material. A suitable electron conducting material that does not induce chemical change in batteries may be used. Examples of the conducting agent may include natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used alone or in a combination of at least two thereof. The conducting agent may be included in the active material in a suitable amount for a lithium battery. For example, a weight ratio of the active material to the conducting agent may be about 98:2 to about 92:8.

The second, e.g., positive, electrode 114 may include a current collector and another active material layer, e.g., a positive active material layer, on the current collector.

The current collector may be formed of, e.g., aluminum (Al). The current collector may be in the form of, e.g., a thin film, plate, mesh (grid), foam (sponge), or the like.

The other active material may include a suitable active material. For example, a compound that facilitates reversible intercalation and deintercalation of lithium may be used. For example, at least one of lithium composite oxides with a metal selected from among Co, Mn, Ni, and a combination thereof may be used. An example of the lithium composite oxide may include a compound represented by one of the following formulae: $Li_aA_{1-b}B_bD_2$ (where $0.90 \le a \le 1.8$, and $0 \le b \le 0.5$); $Li_aE_{1-b}B_bO_{2-c}D_c$ (where $0.90 \le a \le 1.8$, $0 \le b \le 0.5$, and $0 \le c \le 0.05$); $LiE_{2-b}B_bO_{4-c}D_c$ (where $0 \le b \le 0.5$, and $0 \le c \le 0.05$); $Li_aNi_{1-b-c}Co_bB_cD_\alpha$ (where $0.90 \le a \le 1.8$, $0 \le b \le 0.5$, $0 \le c \le 0.05$, and $0 < \alpha \le 2$); $Li_aNi_{1-b-c}Co_bB_cO_{2-\alpha}F_2$ (where $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_2$ (where $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dG_eO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \leq a \leq 1.8$, and $0.001 \leq b \leq 0.1$); $LiQO_2$; $LiQS_2$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

Examples of the other, e.g., positive, active material may include $LiMn_2O_4$, $LiNi_2O_4$, $LiCoO_2$, $LiNiO_2$, $LiMnO_2$, $Li_2MnO_3$, $LiFePO_4$, $LiNi_xCo_yO_2$ (where $0<x \leq 0.15$ and $0<y \leq 0.85$), $V_2O_5$, and TiS.

In the formulae above, A may be selected from the group of nickel (Ni), cobalt (Co), manganese (Mn), and combinations thereof; B may be selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from the group of oxygen (O), fluorine (F), sulfur (S), phosphorus (P), and combinations thereof; E may be selected from the group of cobalt (Co), manganese (Mn), and combinations thereof; F may be selected from the group of fluorine (F), sulfur (S), phosphorus (P), and combinations thereof; G may be selected from the group of aluminum (Al), chromium (Cr), manganese (Mn), iron (Fe), magnesium (Mg), lanthanum (La), cerium (Ce), strontium (Sr), vanadium (V), and combinations thereof; Q may be selected from the group of titanium (Ti), molybdenum (Mo), manganese (Mn), and combinations thereof; I may be selected from the group of chromium (Cr), vanadium (V), iron (Fe), scandium (Sc), yttrium (Y), and combinations thereof; and J may be selected from the group of vanadium (V), chromium (Cr), manganese (Mn), cobalt (Co), nickel (Ni), copper (Cu), and combinations thereof.

The compounds listed above as other, e.g., positive, active materials may have a coating layer on a surface thereof. Alternatively, a mixture of a compound without having a coating layer and a compound having a coating layer, the compounds being selected from the compounds listed above, may be used. The coating layer may include at least one compound of a coating element selected from the group of oxide, hydroxide, oxyhydroxide, oxycarbonate, and hydroxycarbonate of the coating element. The compounds for the coating layer may be amorphous or crystalline. The coating element for the coating layer may include, e.g., magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using a suitable method that does not adversely affect the physical properties of the other, e.g., positive, active material when a compound of the coating element is used. For example, the coating layer may be formed using a spray coating method, a dipping method, or the like.

The other, e.g., positive, active material layer may include a binder and a conducting agent.

The binder may strongly bind active material particles together and to a current collector. Examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent may provide conductivity to the second, e.g., positive, electrode. A suitable electron conducting material that does not induce chemical change in batteries may be used. Examples of the conducting agent may include natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used alone or in a combination of at least two thereof.

The other, e.g., positive, active material, the binder, and the conducting agent may be included in a suitable amount for a lithium battery. For example, a weight ratio of the other, e.g., positive, active material to a mixture of the conducting agent and the binder may be about 98:2 to about 92:8. In an implementation, a mixing ratio of the conducting agent to the binder may be, e.g., about 1:1.0 to about 1:3.

The first, e.g., negative, electrode 112 and the second, e.g., positive, electrode 114 may be each manufactured by mixing an active material, a binder, and a conducting agent in a solvent to prepare an active material composition, and coating the active material composition on a current collector. In an implementation, N-methylpyrrolidone may be used as the solvent.

A separator may be further disposed between the first electrode and the second electrode, according to the type of the lithium secondary battery. The separator may be a monolayer or a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Preparation of Active Material

Example 1

0.2 parts by weight of aluminum isopropoxide ($Al(OCH(CH_3)_2)_3$), based on 100 parts by weight of an active material, was dissolved in 99.8 mL of water to prepare an aluminum-based precursor solution. 10 g of a silicon alloy (available from 3M) was immersed in 100 mL of the aluminum-based precursor solution, and stirred at room temperature for about 24 hours. Afterward, the immersed silicon alloy was thermally treated at about 100° C. for about 24 hours to obtain an active material having an about 36-nm thick, layer-structured $Al(OH)_3$ coating layer with a porosity of about 34% on the silicon alloy core.

Example 2

An active material was prepared in the same manner as in Example 1, except that 0.5 parts by weight of aluminum isopropoxide ($Al(OCH(CH_3)_2)_3$), based on 100 parts by weight of the active material, instead of 0.2 parts by weight of $Al(OCH(CH_3)_2)_3$ dissolved in 99.8 mL of water, was dissolved in 99.58 mL of water to prepare an aluminum-based precursor solution. The active material had an about 93-nm thick, layer-structured $Al(OH)_3$ coating layer with a porosity of about 28% on the silicon alloy core.

Example 3

An active material was prepared in the same manner as in Example 1, except that 1.0 parts by weight of aluminum isopropoxide $(Al(OCH(CH_3)_2)_3)$, based on 100 parts by weight of the negative active material, instead of 0.2 parts by weight of $Al(OCH(CH_3)_2)_3$ dissolved in 99.8 mL of water, was dissolved in 99.0 mL of water to prepare an aluminum-based precursor solution. The active material had an about 187-nm thick, layer-structured $Al(OH)_3$ coating layer with a porosity of about 38% on the silicon alloy core.

Example 4

1.0 parts by weight of aluminum isopropoxide $(Al(OCH(CH_3)_2)_3)$, based on 100 parts by weight of the active material, instead of 0.2 parts by weight of $Al(OCH(CH_3)_2)_3$ dissolved in 99.8 mL of water, was dissolved in 99.0 mL of water to prepare an aluminum-based precursor solution. 10 g of silicon nanowires (average diameter: 50-80 nm, average length: 3 to 4 μm, available from Nanosys, Inc.) were immersed in 100 mL of the aluminum-based precursor solution, and stirred at room temperature for about 24 hours. Afterward, the immersed silicon nanowires were thermally treated at about 100° C. for about 24 hours to obtain an active material having an about 32-nm thick, layer-structured $Al(OH)_3$ coating layer with a porosity of about 32% on the silicon nanowires as a core.

Example 5

0.2 parts by weight of aluminum isopropoxide $(Al(OCH(CH_3)_2)_3)$, based on 100 parts by weight of a active material was dissolved in 99.8 mL of water to prepare an aluminum-based precursor solution. 10 g of a silicon alloy (available from 3M) was immersed in 100 mL of the aluminum-based precursor solution, and stirred at room temperature for about 24 hours. Afterward, the immersed silicon alloy was thermally treated at about 100° C. for about 24 hours to form an about 36-nm thick, layer-structured $Al(OH)_3$ coating layer with a porosity of about 34% on the silicon alloy core. Afterward, the silicon alloy core with the $Al(OH)_3$ coating layer was carbonized at about 600° C. to form an additional graphite coating layer (having a thickness of about 86 nm) on the $Al(OH)_3$ coating layer, thereby preparing the active material.

Example 6

0.5 parts by weight of aluminum isopropoxide $(Al(OCH(CH_3)_2)_3)$, based on 100 parts by weight of a active material was dissolved in 99.5 mL of water to prepare an aluminum-based precursor solution. 10 g of a silicon alloy (available from 3M) was immersed in 100 mL of the aluminum-based precursor solution, and stirred at room temperature for about 24 hours. Afterward, the immersed silicon alloy was thermally treated at about 100° C. for about 24 hours to form an about 93-nm thick, layer-structured $Al(OH)_3$ coating layer with a porosity of about 28% on the silicon alloy core. Afterward, the silicon alloy core with the $Al(OH)_3$ coating layer was carbonized at about 600° C. to form an additional graphite coating layer (having a thickness of about 92 nm) on the $Al(OH)_3$ coating layer, thereby preparing the active material.

Example 7

1.0 part by weight of aluminum isopropoxide $(Al(OCH(CH_3)_2)_3)$, based on 100 parts by weight of a active material was dissolved in 99 mL of water to prepare an aluminum-based precursor solution. 10 g of a silicon alloy (available from 3M) was immersed in 100 mL of the aluminum-based precursor solution, and stirred at room temperature for about 24 hours. Afterward, the immersed silicon alloy was thermally treated at about 100° C. for about 24 hours to form an about 187-nm thick, layer-structured $Al(OH)_3$ coating layer with a porosity of about 38% on the silicon alloy core. Afterward, the silicon alloy core with the $Al(OH)_3$ coating layer was carbonized at about 600° C. to form an additional graphite coating layer (having a thickness of about 104 nm) on the $Al(OH)_3$ coating layer, thereby preparing the active material.

Example 8

1.0 part by weight of aluminum isopropoxide $(Al(OCH(CH_3)_2)_3)$, based on 100 parts by weight of a active material was dissolved in 99 mL of water to prepare an aluminum-based precursor solution. 10 g of silicon nanowires (average diameter: 50-80 nm, average length: 3 to 4 μm, available from Nanosys, Inc.) were immersed in 100 mL of the aluminum-based precursor solution, and stirred at room temperature for about 24 hours. Afterward, the immersed silicon nanowires were thermally treated at about 100° C. for about 24 hours to form an about 34-nm thick, layer-structured $Al(OH)_3$ coating layer with a porosity of about 32% on the silicon nanowires as a core. Afterward, the silicon nanowires with the $Al(OH)_3$ coating layer were carbonized at about 600° C. to form an additional graphite coating layer (having a thickness of about 82 nm) on the $Al(OH)_3$ coating layer, thereby preparing the active material.

Comparative Example 1

An active material was prepared by using 10 g of a silicon alloy (available from 3M).

Comparative Example 2

An active material was prepared by using 10 g of silicon nanowires (average diameter: 50-80 nm, average length: 3 to 4 μm, available from Nanosys, Inc.).

Manufacture of Lithium Secondary Battery

Example 9

The active material of Example 1, carbon black (ketjen black), and a binder represented by Formula 1, below, were mixed in a weight ratio of 3 wt % together with ionized waver to prepare an active material slurry. The active material slurry was coated on a copper (Cu)-foil having a thickness of 15 μm, dried at about 110° C. for 15 minutes, and further in a vacuum at about 150° C. for 4 hours, and then roll-pressed to manufacture an electrode. A coin half-cell was manufactured using the electrode, a lithium counter electrode, a microporous polypropylene separator (Celgard 3501), and an electrolyte containing ethylene carbonate (EC), diethylene carbonate (DEC), and fluoroethylene carbonate (FEC) in a volume ratio of 5:70:25 in a glove box filled with helium.

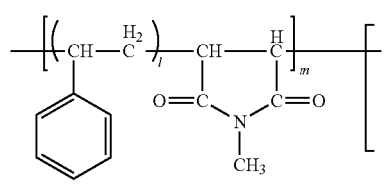

[Formula 1]

In Formula 1 above, l is an integer from 1 to about 5, m is an integer from 1 to about 5, n is an integer from 0 to about 5, p is an integer from 0 to about 10, and q is an integer from 1 to about 10, where l+m=10. The binder of Formula 1 ha a weight average molecular weight of about 100,000 to about 800,000.

Example 10

A coin half-cell was manufactured in the same manner as in Example 9, except that the active material of Example 2, instead of the active material of Example 1, was used.

Example 11

A coin half-cell was manufactured in the same manner as in Example 9, except that the active material of Example 3, instead of the active material of Example 1, was used.

Example 12

A coin half-cell was manufactured in the same manner as in Example 9, except that the active material of Example 4, instead of the active material of Example 1, was used.

Example 13

A coin half-cell was manufactured in the same manner as in Example 9, except that the active material of Example 5, instead of the active material of Example 1, was used.

Example 14

A coin half-cell was manufactured in the same manner as in Example 9, except that the active material of Example 6, instead of the active material of Example 1, was used.

Example 15

A coin half-cell was manufactured in the same manner as in Example 9, except that the active material of Example 7, instead of the active material of Example 1, was used.

Example 16

A coin half-cell was manufactured in the same manner as in Example 9, except that the active material of Example 8, instead of the active material of Example 1, was used.

Example 17

The active material of Example 5, carbon black (ketjen black), and a binder represented by Formula 1 below were mixed in a weight ratio of 3 wt % together with ionized waver to prepare an active material slurry. The active material slurry was coated on a copper (Cu)-foil having a thickness of 15 μm, dried at about 110° C. for 15 minutes, and further in a vacuum at about 150° C. for 4 hours, and then roll-pressed to manufacture an electrode. A coin half-cell was manufactured using the electrode, a lithium counter electrode, a microporous polypropylene separator (Celgard 3501), and an electrolyte containing ethylene carbonate (EC), diethylene carbonate (DEC), and fluoroethylene carbonate (FEC) in a volume ratio of 5:70:25 in a glove box filled with helium.

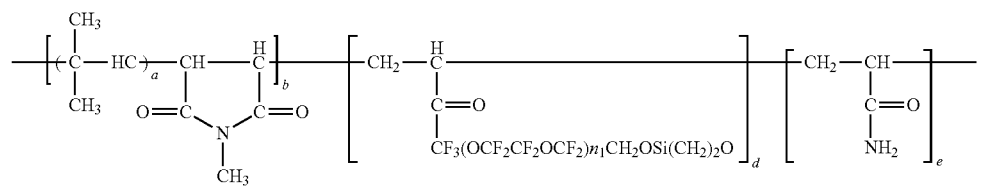

[Formula 2]

In Formula 2 above, a is an integer from 1 to about 5, b is an integer from 1 to about 5, n1 is an integer from 0 to about 5, d is an integer from 0 to about 10, and e is an integer from 1 to about 10, where a+b=10.

The binder of Formula 2 had a weight average molecular weight of about 100,000 to about 800,000.

Example 18

The active material of Example 5, carbon black (ketjen black), and a binder represented by Formula 3 below were mixed in a weight ratio of 3 wt % together with ionized waver to prepare an active material slurry. The active material slurry was coated on a copper (Cu)-foil having a thickness of 15 μm, dried at about 110° C. for 15 minutes, and further in a vacuum at about 150° C. for 4 hours, and then roll-pressed to manufacture an electrode. A coin half-cell was manufactured using the electrode, a lithium counter electrode, a microporous polypropylene separator (Celgard 3501), and an electrolyte containing ethylene carbonate (EC), diethylene carbonate (DEC), and fluoroethylene carbonate (FEC) in a volume ratio of 5:70:25 in a glove box filled with helium.

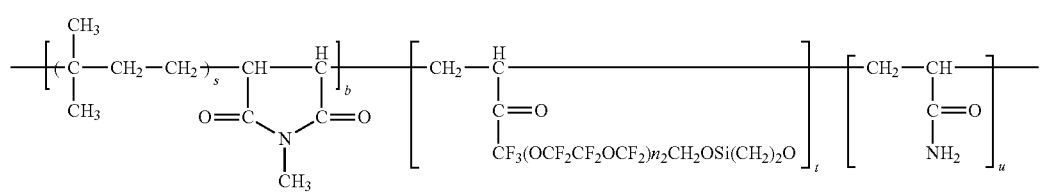

[Formula 3]

In Formula 3 above, r is an integer from 1 to about 5, s is an integer from 1 to about 5, $n_2$ is an integer from 0 to about 5, t is an integer from 0 to about 10, and u is an integer from 1 to about 10, where r+s=10.

The binder of Formula 4 had a weight average molecular weight of about 100,000 to about 800,000.

Comparative Example 3

A coin half-cell was manufactured in the same manner as in Example 9, except that the active material of Comparative Example 1, instead of the active material of Example 1, was used.

Comparative Example 4

A coin half-cell was manufactured in the same manner as in Example 9, except that the active material of Comparative Example 2, instead of the active material of Example 1, was used.

Surface Analysis on Negative Active Material

Analysis Example 1

Scanning Electron Microscopic (SEM) Analysis

A surface of the active material of Example 2 was observed using a scanning electron microscope (SEM, Sirion FEI, available from FEI) at a magnification of ×3000. The results are shown in FIG. 2.

Figure 2:
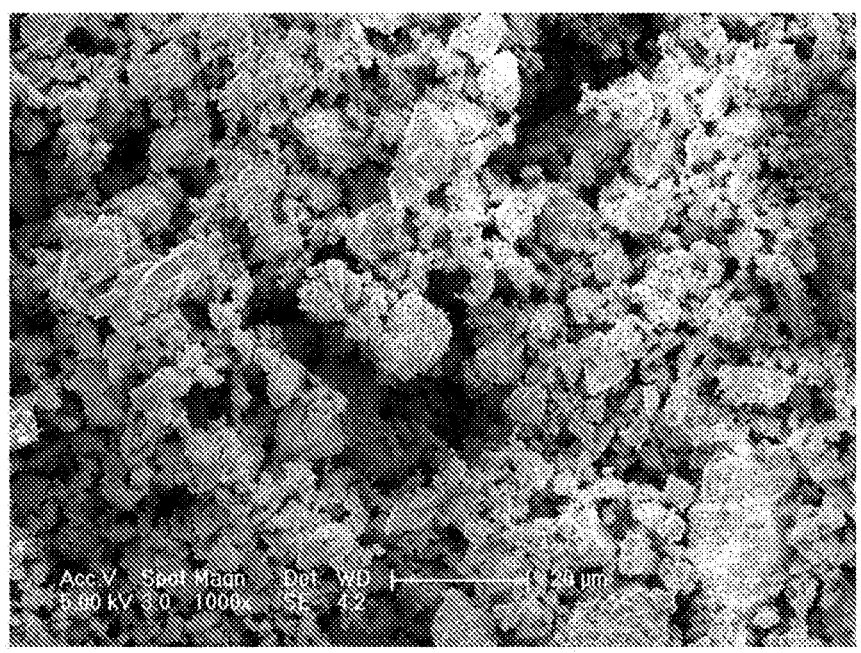
FIG. 2 illustrates a scanning electron microscopic (SEM) image of an aluminum source coating layer of a negative active material prepared according to Example 2.

Referring to FIG. 2, the active material of Example 2 was found to have a porous $Al(OH)_3$ layer on the surface thereof.

Analysis Example 2

Energy Dispersive X-Ray Spectroscopic (EDX) Analysis

X-ray spectroscopic (EDX) analysis was performed on the active materials of Examples 1 to 3. The results are shown in FIG. 3.

Figure 3:
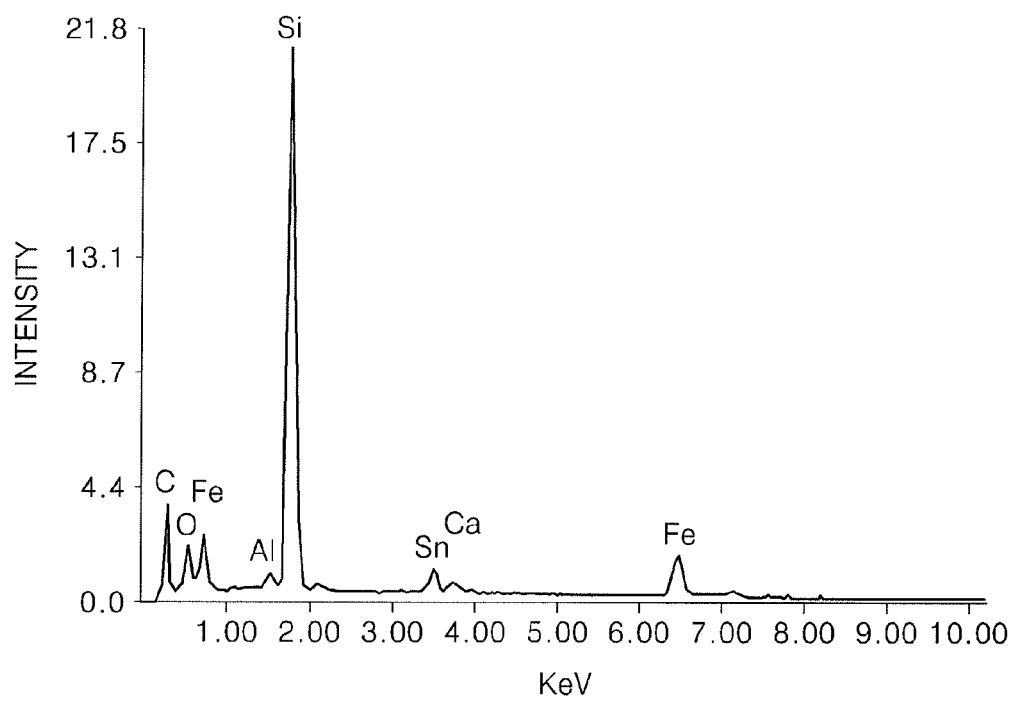
FIG. 3 illustrates a graph of results of energy dispersive X-ray spectroscopic analysis on the negative active material of Example 2.

Referring to FIG. 3, an X-ray peak of the oxygen (O) element, and an X-ray peak of the aluminum (Al) element appeared at about 0.5 KeV and about 1.5 KeV, respectively. Therefore, referring to FIG. 3, the active materials of Examples 1 to 3 were found to have a porous $Al(OH)_3$ layer on the surface thereof.

Expansion Ratio of Electrode and Performance Test of Lithium Secondary Battery

Evaluation Example 1

Evaluation of Electrode Expansion Ratio

After the coin half-cells of Examples 9 to 18 and Comparative Examples 3 and 4 were kept at room temperature for about 24 hours, each of the coin half-cells was charged once at a constant current of 0.05 C rate in a voltage of from about 0.01 V to about 1.5 V with respect to lithium metal, and then was disassembled to measure a change in thickness of the electrode. A volume expansion ratio of the coin half-cell was calculated according to Equation 1 below. The results are shown in Table 1 below.

Volume expansion ratio of electrode [%]=[(electrode thickness after charging−electrode thickness before charging)/(electrode thickness before charging)]×100        <Equation 1>

TABLE 1

| Example | Electrode thickness before charging (μm) | Electrode thickness after charging (μm) | Volume expansion ratio of electrode (%) |
|---|---|---|---|
| Example 9 | 48 | 60 | 32 |
| Example 10 | 48 | 58 | 26 |
| Example 11 | 46 | 55 | 25 |
| Example 12 | 48 | 59 | 29 |
| Example 13 | 49 | 62 | 33 |
| Example 14 | 49 | 60 | 28 |
| Example 15 | 48 | 58 | 26 |
| Example 16 | 48 | 59 | 29 |
| Example 17 | 47 | 56 | 24 |
| Example 18 | 48 | 58 | 26 |
| Comparative Example 3 | 46 | 66 | 55 |
| Comparative Example 4 | 46 | 67 | 58 |

Referring to Table 1 above, the electrodes of the coin half-cells of Examples 9 to 18 had smaller volume expansion ratios than the electrodes of the coin half-cells of Comparative Examples 3 and 4.

These results indicate that the coin half-cells of Examples 9 to 18 may effectively control volumetric expansion of the silicon-based core of the active material during charging and discharging, as compared with the coin half-cells of Comparative Examples 3 and 4.

Evaluation Example 2

Characteristics Evaluation of Lithium Secondary Battery

After the coin half-cells of Examples 9 to 18 and Comparative Examples 3 and 4 were kept at room temperature for about 24 hours, each of the coin half-cells was charged once at a constant current of 0.05 C rate in a voltage of from about 0.01 V to about 1.5 V with respect to lithium metal to measure an initial capacity. The results are shown in Table 2 below.

TABLE 2

| Example | Initial efficiency (%) | Discharge capacity at 1st cycle (mAh/g) |
| --- | --- | --- |
| Example 9 | 86 | 515 |
| Example 10 | 86 | 512 |
| Example 11 | 86 | 511 |
| Example 12 | 85 | 506 |
| Example 13 | 88 | 509 |
| Example 14 | 87 | 502 |
| Example 15 | 87 | 499 |
| Example 16 | 86 | 492 |
| Example 17 | 90 | 513 |
| Example 18 | 89 | 511 |
| Comparative Example 3 | 84 | 511 |
| Comparative Example 4 | 83 | 502 |

After further charging and discharging at a constant current of 0.2 C rate two times, and at a constant current of 1.0 C rate fifty times, a discharge capacity of each of the coin half-cells was measured, and a capacity retention rate was calculated therefrom according to Equation 2 below. The results are shown in Table 3 below.

$$\text{Capacity retention rate [\%]} = [\text{Discharge capacity at 50th cycle}/\text{Discharge capacity at } 1^{st} \text{ cycle}] \times 100 \quad \text{<Equation 2>}$$

TABLE 3

| Example | Capacity retention rate (%) |
| --- | --- |
| Example 9 | 85 |
| Example 10 | 85 |
| Example 11 | 84 |
| Example 12 | 82 |
| Example 13 | 88 |
| Example 14 | 86 |
| Example 15 | 85 |
| Example 16 | 84 |
| Example 17 | 87 |
| Example 18 | 86 |
| Comparative Example 3 | 83 |
| Comparative Example 4 | 82 |

Referring to Table 2, the coin half-cells of Examples 9 to 18 exhibited improved initial efficiencies, as compared with the coin half-cells of Comparative Examples 3 and 4.

Referring to Table 3, the coin half-cells of Examples 9 to 18 exhibited improved capacity retention rates, as compared with the lithium secondary batteries of Comparative Examples 3 and 4.

These results indicate that the coin half-cells of Examples 9 to 18 had improved lifetime characteristics, as compared with the lithium secondary batteries of Examples 9 to 18.

By way of summation and review, lithium secondary batteries may use carbonaceous materials, e.g., graphite, as negative active materials. However, higher capacity negative active materials for the development of batteries with high energy densities may be desirable Negative active materials containing silicon, e.g., a silicon compound or a silicon alloy, may be as alternatives to such carbonaceous materials. Silicon-containing negative active materials may undergo volume expansion or shrinkage of silicon particles with repeated charging and discharging, resulting in voids, which may also become larger. Thus, lifetime characteristics of the silicon-containing negative active materials may be deteriorated.

Silicon in the form of SiO and/or $SiO_2$, using nanosized Si in the form of being uniformly dispersed in graphite, or using Si in the form of a silicon alloy may be used. However, such materials may still undergo undesirable volumetric expansion of silicon particles. Therefore, a negative active material with improved initial efficiency, capacity, and lifetime characteristics may be desirable.

The embodiments provide an active material with improved capacity and lifetime characteristics. The embodiments provide an active material, e.g., a negative active material, with improved initial efficiency, capacity, and lifetime characteristics.

A lithium secondary battery including an active material according to an embodiment, e.g., with an aluminum source coating layer in at least part of a silicon-based base material, may have improved initial efficiency, capacity, and lifetime characteristics due to the aluminum source coating layer that serves as a buffer layer against volumetric expansion of the silicon-based base material during charging and discharging of the lithium secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a secondary battery, the active material comprising:
    a silicon-based core; and
    an aluminum-based coating layer on at least a part of the silicon-based core, wherein the aluminum-based coating layer includes $Al(OH)_3$, and
    wherein the aluminum-based coating layer is porous and has a porosity of about 0.01% to about 50%.

2. The negative active material as claimed in claim 1, wherein the aluminum-based coating layer has a layered structure.

3. The negative active material as claimed in claim 1, wherein the active material further includes a carbonaceous coating layer on an outer surface of the aluminum-based coating layer.

4. The negative active material as claimed in claim 1, wherein the active material further includes a binder layer on an outer surface of the aluminum-based coating layer.

5. The negative active material as claimed in claim 4, wherein the binder layer includes at least one of polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polymethylmethacrylate, polyethylene, polypropylene, styrene-butadiene rubber (SBR), isoprene rubber, polysulfide rubber, chloroprene rubber, silicon rubber, ethylene propylene diene monomer rubber, fluoroelastomer, acethylated SBR, acrylated SBR, epoxy resin, and nylon.

6. The negative active material as claimed in claim 1, wherein the silicon-based core includes at least one of silicon and a silicon alloy.

7. The negative active material as claimed in claim 6, wherein the silicon-based core includes the silicon alloy, the silicon alloy including silicon and at least one of a transition metal, tin, and calcium.

8. The negative active material as claimed in claim 7, wherein the transition metal includes at least one of nickel, titanium, and iron.

9. The negative active material as claimed in claim 7, wherein the silicon alloy includes about 0.1 to about 40 parts by weight of the at least one of a transition metal, tin, and calcium, based on 100 parts by weight of the active material.

10. The negative active material as claimed in claim 1, wherein the silicon-based core includes a composite material of silicon or silicon oxide with graphite.

11. A secondary battery, comprising:
a first electrode;
a second electrode; and
a separator between the first electrode and the second electrode,
wherein the first electrode is a negative electrode and includes the negative active material as claimed in claim 1.

12. The secondary battery as claimed in claim 11, wherein the silicon-based core of the active material includes at least one of silicon and a silicon alloy.

13. A method of preparing a negative active material for a secondary battery, the method comprising:
preparing an aluminum-based precursor solution;
immersing a silicon-based material in the aluminum-based precursor solution to provide an immersed silicon-based material; and
thermally treating the immersed silicon-based material such that the active material includes a silicon-based core and an $Al(OH)_3$-containing coating layer on at least a part of the silicon-based core, and
wherein the $Al(OH)_3$-containing coating layer is porous and has a porosity of about 0.01% to about 50%.

14. The method as claimed in claim 13, wherein the aluminum-based precursor solution includes at least one of aluminum alkoxide, aluminum oxide, aluminum acetylacetonate, and aluminum nitride.

15. The method as claimed in claim 13, wherein thermally treating the immersed silicon-based material in the aluminum-based precursor solution includes exposing the solution to a temperature of about 80° C. to about 200° C. for about 1 hour to about 48 hours.

16. The method as claimed in claim 13, further comprising mixing the active material with a binder such that the active material includes a binder layer on an outer surface of the $Al(OH)_3$-containing coating layer.

* * * * *